United States Patent
De Martino et al.

(10) Patent No.: US 9,038,386 B2
(45) Date of Patent: May 26, 2015

(54) THERMAL VECTOR SYSTEM FOR SOLAR CONCENTRATION POWER PLANT

(75) Inventors: Pasquale De Martino, Pignola (IT); Paolo Harabaglia, Satriano di Lucania (IT)

(73) Assignees: INTERNEW ELECTRONICS S.R.L., Pignola (PZ) (IT); GIORDANO MICHELE DI GIORDANO MICHELE, Tito (PZ) (IT); GEODESK.IT DI DE MARTINO PASQUALE, Pignola (PZ) (IT)

( * ) Notice: Subject to any disclaimer, the term of this patent is extended or adjusted under 35 U.S.C. 154(b) by 874 days.

(21) Appl. No.: 13/063,017

(22) PCT Filed: Sep. 10, 2009

(86) PCT No.: PCT/IB2009/006794
§ 371 (c)(1),
(2), (4) Date: Apr. 22, 2011

(87) PCT Pub. No.: WO2010/029411
PCT Pub. Date: Mar. 18, 2010

(65) Prior Publication Data
US 2011/0197585 A1 Aug. 18, 2011

(30) Foreign Application Priority Data
Sep. 12, 2008 (IT) .............................. SA2008A0028

(51) Int. Cl.
*F24J 2/34* (2006.01)
*F24J 2/04* (2006.01)
*F24J 2/12* (2006.01)
(Continued)

(52) U.S. Cl.
CPC .. *F24J 2/055* (2013.01); *F24J 2/12* (2013.01); *Y02E 10/45* (2013.01); *F24J 2/07* (2013.01); *F24J 2/34* (2013.01); *F24J 2/4621* (2013.01); *F24J 2/4649* (2013.01); *Y02B 10/22* (2013.01); *Y02E 10/41* (2013.01); *Y02E 10/44* (2013.01); *Y02E 10/46* (2013.01)

(58) Field of Classification Search
USPC ................................ 126/620, 713; 60/641.13
See application file for complete search history.

(56) References Cited

U.S. PATENT DOCUMENTS 3,908,632 A 9/1975 Poulsen
3,955,554 A * 5/1976 Collie ........................... 126/586
(Continued)

FOREIGN PATENT DOCUMENTS

CA 2542672 A1 10/2007
EP 1361404 A2 * 11/2003
(Continued)

OTHER PUBLICATIONS

Thermal Energy Storage/Waste Heat Recovery Applications in the Cement Industry—Beshore et al (1979).*

*Primary Examiner* — Thomas Denion
*Assistant Examiner* — Jessica Kebea
(74) *Attorney, Agent, or Firm* — Lucas & Mercanti, LLP

(57) ABSTRACT

The present invention relates to a thermal vector system for solar concentration plants, in particular for parabolic trough solar concentration plants, both for industrial and domestic use, comprising a solid state thermal vector. A preferred solar concentration plant comprises one or more solar collectors (1), an heat exchanger (3-5), a heat accumulator (2) and a connecting pipe circuit, in which a solid state thermal vector is pushed through said circuit by mechanical means (6).

12 Claims, 5 Drawing Sheets

(51) Int. Cl.
*F24J 2/00* (2014.01)
*F24J 2/05* (2006.01)
*F24J 2/07* (2006.01)
*F24J 2/46* (2006.01)

(56) References Cited

U.S. PATENT DOCUMENTS

| | | | | |
|---|---|---|---|---|
| 3,973,552 A | * | 8/1976 | Ervin, Jr. | 126/619 |
| 4,010,731 A | * | 3/1977 | Harrison | 126/620 |
| 4,037,583 A | * | 7/1977 | Bakun et al. | 126/620 |
| 4,038,557 A | * | 7/1977 | Gildersleeve et al. | 290/1 R |
| 4,055,948 A | * | 11/1977 | Kraus et al. | 60/641.8 |
| 4,116,222 A | | 9/1978 | Seifried | |
| 4,184,447 A | * | 1/1980 | Shichijo et al. | 116/262 |
| 4,229,184 A | * | 10/1980 | Gregg | 48/62 R |
| 4,258,698 A | * | 3/1981 | Sales | 126/700 |
| 4,290,779 A | * | 9/1981 | Frosch et al. | 422/186 |
| 4,333,445 A | * | 6/1982 | Lee | 126/617 |
| 4,338,919 A | | 7/1982 | Hwang | |
| 4,499,893 A | * | 2/1985 | Hunt et al. | 126/674 |
| 4,513,733 A | * | 4/1985 | Braun | 126/643 |
| 4,588,478 A | * | 5/1986 | Warzel | 202/99 |
| 4,706,651 A | * | 11/1987 | Yudow | 126/681 |
| 5,947,114 A | | 9/1999 | Kribus | |
| 5,994,681 A | | 11/1999 | Lloyd | |
| 8,109,265 B1 | * | 2/2012 | Kolb | 126/684 |
| 2004/0163640 A1 | * | 8/2004 | Kuckelkorn | 126/694 |
| 2010/0180931 A1 | * | 7/2010 | Gode | 136/246 |
| 2013/0228163 A1 | * | 9/2013 | Wait | 126/619 |

FOREIGN PATENT DOCUMENTS

| | | |
|---|---|---|
| GB | 1505659 A | 3/1978 |
| JP | 01291096 A * | 11/1989 |
| WO | 01/90660 A1 | 11/2001 |
| WO | 2004/025193 A1 | 3/2004 |
| WO | WO2012052661 A3 * | 4/2012 |

* cited by examiner

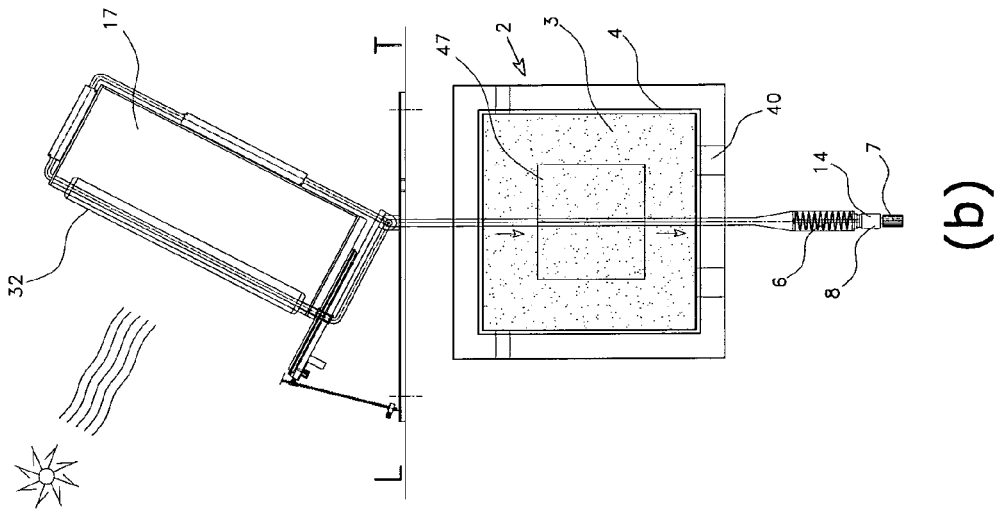
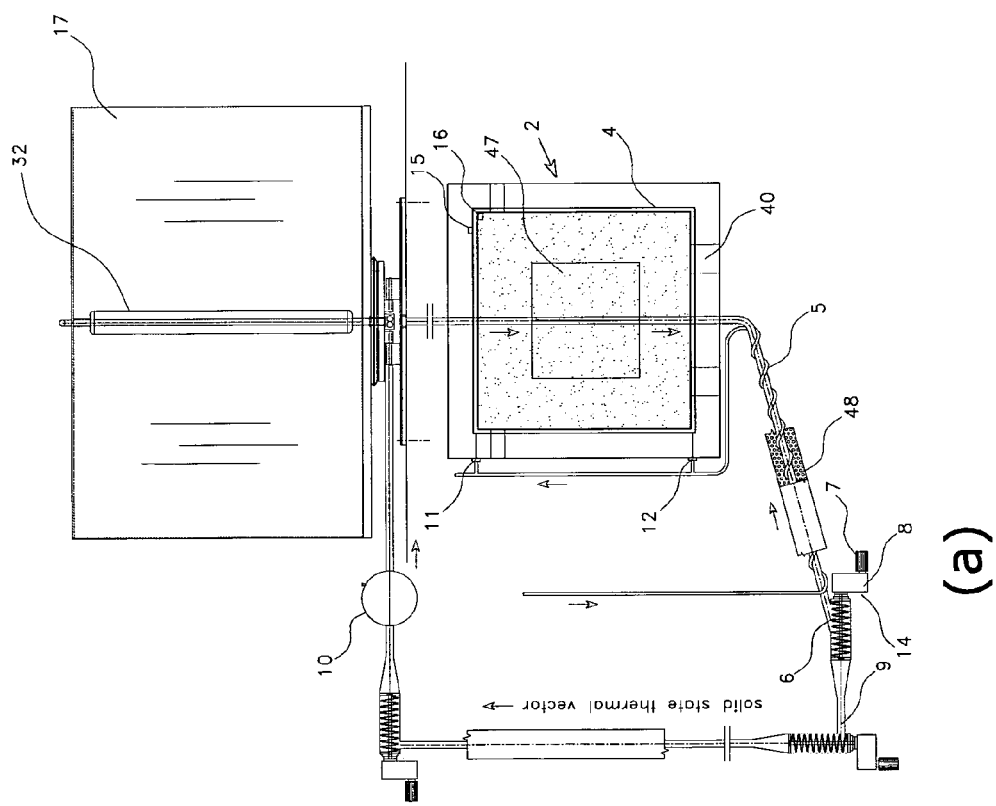
fig. 2 fig. 4
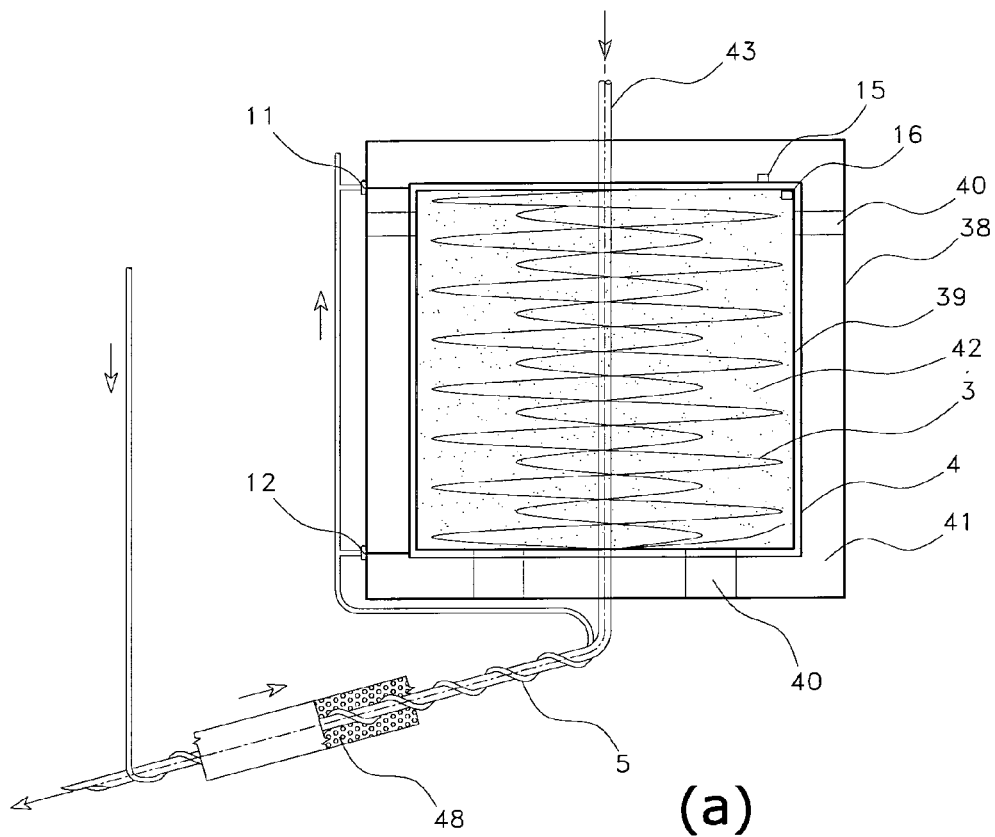
(a)
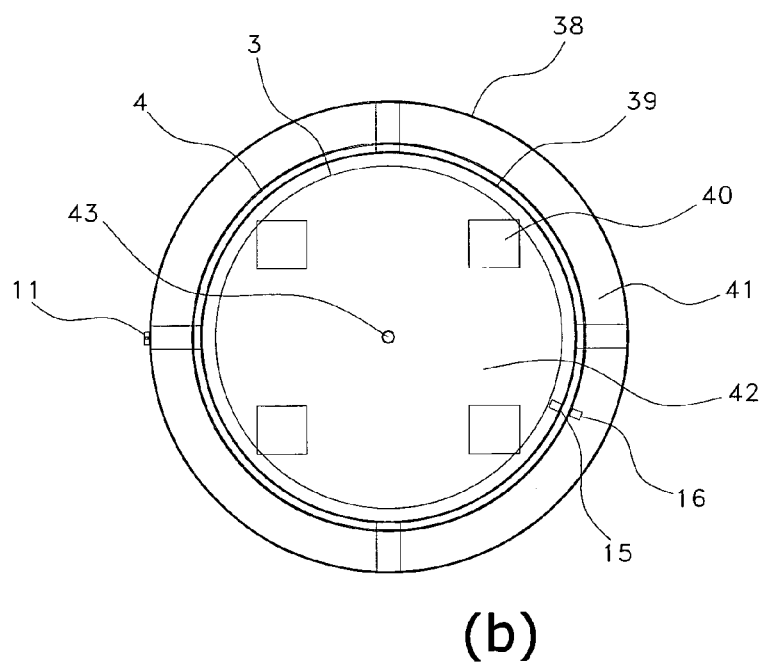
(b)

fig. 5
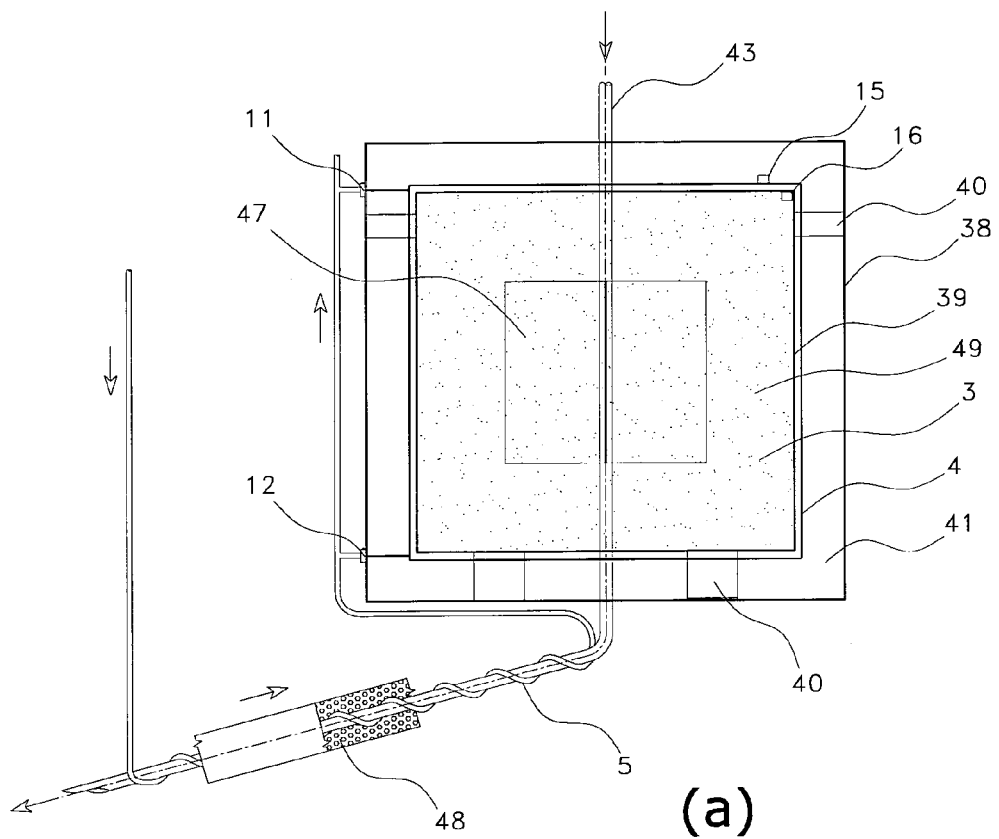
(a)
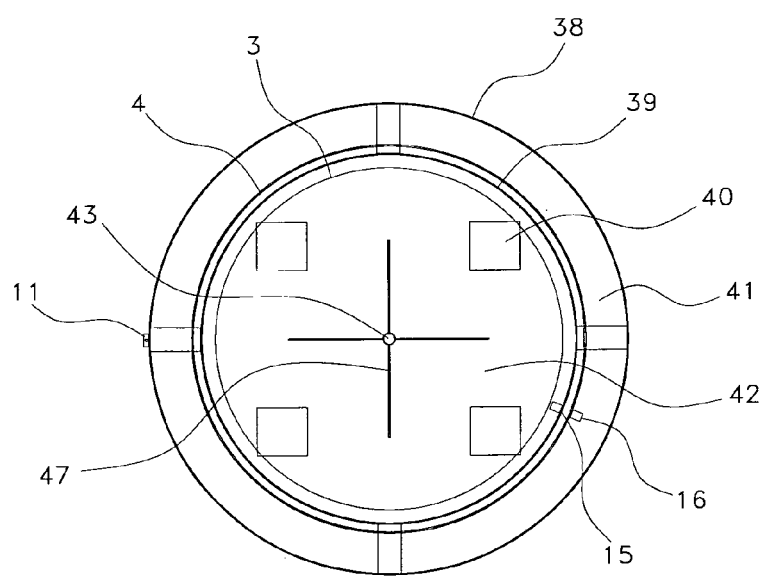
(b)

THERMAL VECTOR SYSTEM FOR SOLAR CONCENTRATION POWER PLANT

CROSS-REFERENCE TO RELATED APPLICATION

This application is a 371 of PCT/IB2009/006794 filed on Sep. 10, 2009, which claims the benefit of Italian Patent Application No. SA2008A000028 filed on Sep. 12, 2008, the contents of each of which are incorporated herein by reference.

TECHNICAL FIELD

The present invention relates to a thermal vector system for solar concentration plants, in particular for parabolic trough solar concentration plants, both for industrial and domestic use.

It should be noticed that with the terms "solar concentration plant" it is hereinafter meant any solar plant in which the solar radiation is concentrated by lens(es) (e.g. Fresnel lenses) or conveniently shaped mirror(s) (e.g. parabolic mirrors) or parabolic troughs or any other suitable means known in the art, on a thermal vector contained in a proper container (e.g. a receiver pipe) in order to exploit the heat produced thereby.

BACKGROUND ART

The principle of concentrating solar power to obtain a source of heat can probably be ascribed to Archimedes. It is only in modern times however, that concentration solar power plants have become viable. In particular the most reliable technology makes use of parabolic troughs as thermal solar concentrators. The solar field has a modular structure, made of linear parabolic collectors, tied up in series, and set along parallel lines several hundreds of meters long. Each collector is made of a reflector of parabolic shape which concentrates the sun rays on a receiving pipe, placed along on the focal line. A thermo-vector fluid pumped up through the receiving pipes, supplies heat to a power station placed at the centre of the solar field. The heat is used to produce steam that sets in action an electrical turbo-generator group.

The first plants of this kind were built in the Mojave Desert at the beginning of the 80s. In Europe the largest plants, the Andasols, are currently built in Spain according to the same basic scheme. All these plants use an inflammable and toxic mineral oil, as thermal working fluid. This diathermic oil is limited in particular to a maximum temperature of about 400° C. Above this threshold, there is a substantial risk of igniting a burning reaction. This means that the efficiency of the plants is necessarily rather low.

In Italy, in the Enea laboratories, the Archimede project has been developed to overcome the diathermic oil limitation. In this case the working fluid is a mixture of molten salts commonly used as fertilizers, namely 60% NaNO3 and 40% KNO3. They can be safely used up to about 550° C., but still have the substantial problem that below about 200° C. they solidify. This means that the main circuit must be kept operational also overnight, using the stored heat or, eventually, heating it with an outside source. Moreover, since efficient steam turbines operate at temperatures of at least 500° C., the stored efficient heat is limited.

Two important components of such solar concentration plants are the receiver pipe (in the solar collector) and the heat storage.

The most advanced receiver pipe on the market today is the so called Angeloantoni one, that has also been developed within the frame of the Archimede project. It is constituted by a metallic pipe, blackened through a super black technique, that is inserted into a glass pipe. Between the glass pipe and the metallic one, vacuum is made in order to create an efficient thermal insulation. Overall this pipe is extremely efficient but fragile, since the two concentric pipes are made of different materials, glass and metal, with different elongation coefficients. This limitation is not particularly severe if the circuit is kept always operational with the working fluid flowing continuously at high temperature, but it is not acceptable in any situation where the working fluid would be halted to cool.

The heat storage, instead, allows to produce steam also in absence of solar radiation for a prolonged period of time. There are cases, such as the Andasol plants, where heat is stored in molten salts reservoirs. The Archimede project does the same. A more innovative project is that of the Australian Cloncurry power plant, a tower plant, that is a totally different approach with respect to trough plants, that stores heat on the top of the tower into purified graphite blocks. Nobody has however still tried to store heat for periods of time longer than a few weeks since heat dispersion is a serious limitation.

Patents or patents applications regarding concentrating solar power plants are also known.

WO2009/004476 discloses a modular assembly for the production and accumulation of solar energy with the fused salts technology. The assembly comprises a tank for the accumulation of fused salts, a reflecting body for capturing the solar rays, a tubular collector, a parabolic body, a delivery circuit and a return circuit.

The tubular collector faces the parabolic body and the delivery and return circuit communicate on one side with the tank and on the other with the collector for supplying the fused salts through the collector. The accumulation tank is set in a position underlying the collector and the delivery and returns circuits are set so as to enable unloading by gravity of the fused salts into the accumulation tank.

WO79/01004 describes a solar energy system comprising a collector, a receiver, a thermal energy accumulator and a thermal energy transfer system. The collector is used to collect and concentrate solar radiation, the receiver associated with the collector is employed for converting the radiation concentrated by the collector into thermal energy, and the thermal energy transfer system is used to transfer thermal energy from the receiver to the thermal energy accumulator. The thermal energy accumulator comprises a mixture of fusible salts.

DISCLOSURE OF THE INVENTION

The aim of the present invention is to provide a thermal vector system for solar concentration plants that will solve some of the drawbacks discussed above in a simple and economically advantageous way.

According to the present invention, a thermal vector system for solar concentration plants, and in particular for parabolic trough solar concentration plants, comprising a solid state thermal vector is provided as in claim 1.

In particular most of the current limitations of solar concentration plants are overcome by means of a solid state system based on a solid state thermal vector preferably pushed through a set of screw conveyors.

Said claimed solid state system, preferably requires a new toroidal shaped receiver pipe, and a new solid state geothermic heat accumulator-exchanger, with an overheated steam generator inside and a steam pre-heater outside that allows to work with temperatures up to about 800° C.

A higher overall efficiency an safety is thus provided, comprising the thermal vector system a solid state thermal vector.

The claimed invention, according to a preferred aspect thereof, provides that the thermal vector at the solid state, later called "SSTV" (Solid State Thermal Vector), is in the shape of a mixture of very-small to small sized grains, or particles which must have the properties of yielding good thermal conductivity and volumetric heat capacity, and whose composition must be such that it can be pushed easily through the pipes by a set of screw conveyors, that it does not undergoes to chemical reactions up to at least 900° C., that it maintains unchanged the mechanical and physical properties both at the normal temperature of exercise and, when the plant is inoperative, that does not yield problems when the plant is halted and then restarted and that does not pose problems of corrosion but actually acts as a natural lubricant. The SSTV (Solid State Thermal Vector) composition can vary depending on the geographic area where it will be used and the purpose of the plant, that is to produce electricity, hot water, low temperature steam or all of them combined. It is however composed by a mixture of inerts, preferably based on the clinker chemistry, that is calcium silicates and calcium aluminates, expanded clay that has undergone a clinker processing, high temperature furnaces ash, purified graphite, and where the empty space is completely filled with helium atmosphere or other noble gases, such as Argon, Neon. All the solid components must undergo a drying procedure at about 900° C. in a furnace for about 24 hours to eliminate all the volatiles and then must be stored in sealed packaging, before loading in the plant. Once the plant is installed and the SSTV is loaded, helium could preferably be introduced to substitute all the other gaseous phases. When the plant will become operational, helium pressure will be about 110 kPa at 0° C.

The solid state thermal vector (SSTV) can therefore be used in a solar concentration plant, and in particular in a parabolic trough solar concentration plant, comprising a plurality of one or more solar collectors (e.g. in the form of linear parabolic collectors, especially in the form of parabolic troughs), an heat exchanger, a heat accumulator and a connecting pipe circuit. The thermal vector is pushed through said connecting pipe circuit by mechanical means.

In particular, according to a preferred embodiment of this invention, said mechanical means may be screw conveyors pushing the solid state thermal vector in such a way that the high temperature portion of the path will be descending so to exploit gravity, while the ascending portion of the path, where the SSTV will be cooler, will be the portion where the screw conveyors will work, avoiding therefore any problem due to the heat.

Essential for the efficient functioning of the said plant and to exploit the overall potentialities of the solid state thermal vector system, important related features are the receiver pipe of the collector and the heat accumulator.

In a solar concentration plant comprising a solid state thermal vector according to the invention, a toroidal shaped receiver pipe of temperature resistant low elongation glass or fused quartz can be used. Said toroidal pipe is obtained solding two cylinders of different diameters, the inner one being darkened on the outside with a black body process that must be at least 99.5% efficient, and than making vacuum inside the toroid, so to obtain a receiver pipe that proves to be more resistant to thermal shocks than those currently on the market, maintaining however an almost equivalent efficiency in terms of thermal insulation as that of the receiver pipes currently available.

Another important feature in the above mentioned solar concentration plant comprising a solid state thermal vector according to the invention, is a solid state geothermal accumulator for storing the heat, buried in the ground.

Said heat accumulator is preferably composed of an external metallic outer shell, an internal core of a material that does not undergoes to chemical reactions up to at least 900° C., used to store heat, and that is in contact with the outer shell only through spacers and a base of thermally insulated material, and the remaining portion of the empty space is filled with depressurized argon to act as an efficient thermal insulator and to avoid any risk of chemical reaction due to free oxygen.

The core of the heat accumulator will be composed of a material with good thermal effusivity, such as graphite, in case of usage in power plants, where it is important to exchange heat fast and efficiently.

Moreover the core of the heat accumulator will be composed of a material with low thermal conductivity and high volumetric heat capacity, such as clinker, in case of usage in plants dedicated to the production of hot water or low temperature steam, where it is important long term storage, in the order of weeks or months, but it is necessary to extract only a small fraction of the contained heat at any given time.

Along the accumulator outcoming SSTV pipe, a pre-heater could be installed, where hot water and eventually low temperature steam, depending on the length of the pre-heater, will be produced, with the water/steam moving in the opposite direction with respect to that of the outcoming SSTV, that will be in the meantime cooled whenever the plant were in a solar energy collection phase, otherwise the water/steam circuit would be closed down by means of electro-valves.

Also inside the accumulator, in the empty space between the outer metallic shell and the inner core, a pre-heater could be installed, where hot water and eventually low temperature steam, depending on the length of the pre-heater, will be produced, whenever the plant were not in a solar energy collection phase, otherwise the water/steam circuit would be closed down by means of electro-valves.

Said pre-heaters, internal and external, are the plant elements where, if required, lower temperature steam will be produced, preventing incrustation in other portions of the plant, and simplifying scaling.

Moreover within the inner core of the accumulator, an over-heater shaped as an adequately long serpentine will be installed, whenever steam to produce electricity will be required, so to have overheated steam at a working temperature of about 550° C. and a pressure of about 5 MPa.

It goes without saying that the overall system will be suitable to be implemented in existing solar concentration power plants, as well as in new ones.

BRIEF DESCRIPTION OF THE DRAWINGS

The invention will now be described with reference to the annexed drawings, which illustrate a non-limiting example of embodiment thereof and in which:

FIGS. 2(a) and 2(b) illustrate a schematic front and side views respectively of a domestic parabolic trough solar concentration plant, according to another aspect of the present invention;

FIGS. 3(a)-(f) are schematic views of a receiver pipe suitable for being implemented in a parabolic trough solar concentration plant, according to a preferred embodiment of the invention, in which FIG. 3(a) is a front view of the receiver pipe as mounted in a plant, FIG. 3(b) is a front view of the receiver pipe alone, FIGS. 3(c) and (d) are longitudinal section views of the receiver pipe taken along line B-B1, figure (e) is a top view of the receiver pipe alone, and FIG. 3(f) is a cross-section view of the receiver pipe taken along line A-A1;

FIGS. 4(a) and 4(b) are front and top views respectively of a heat accumulator suitable for being implemented in an industrial parabolic trough solar concentration plant, according to another embodiment of the present invention; and FIGS. 5(a) and 5(b) are front and top views respectively of a heat accumulator suitable for being implemented in a domestic parabolic trough solar concentration plant, according to a further embodiment of the present invention.

DETAILED DESCRIPTION OF SOME PREFERRED EMBODIMENTS OF THE PRESENT INVENTION

Figure 1:
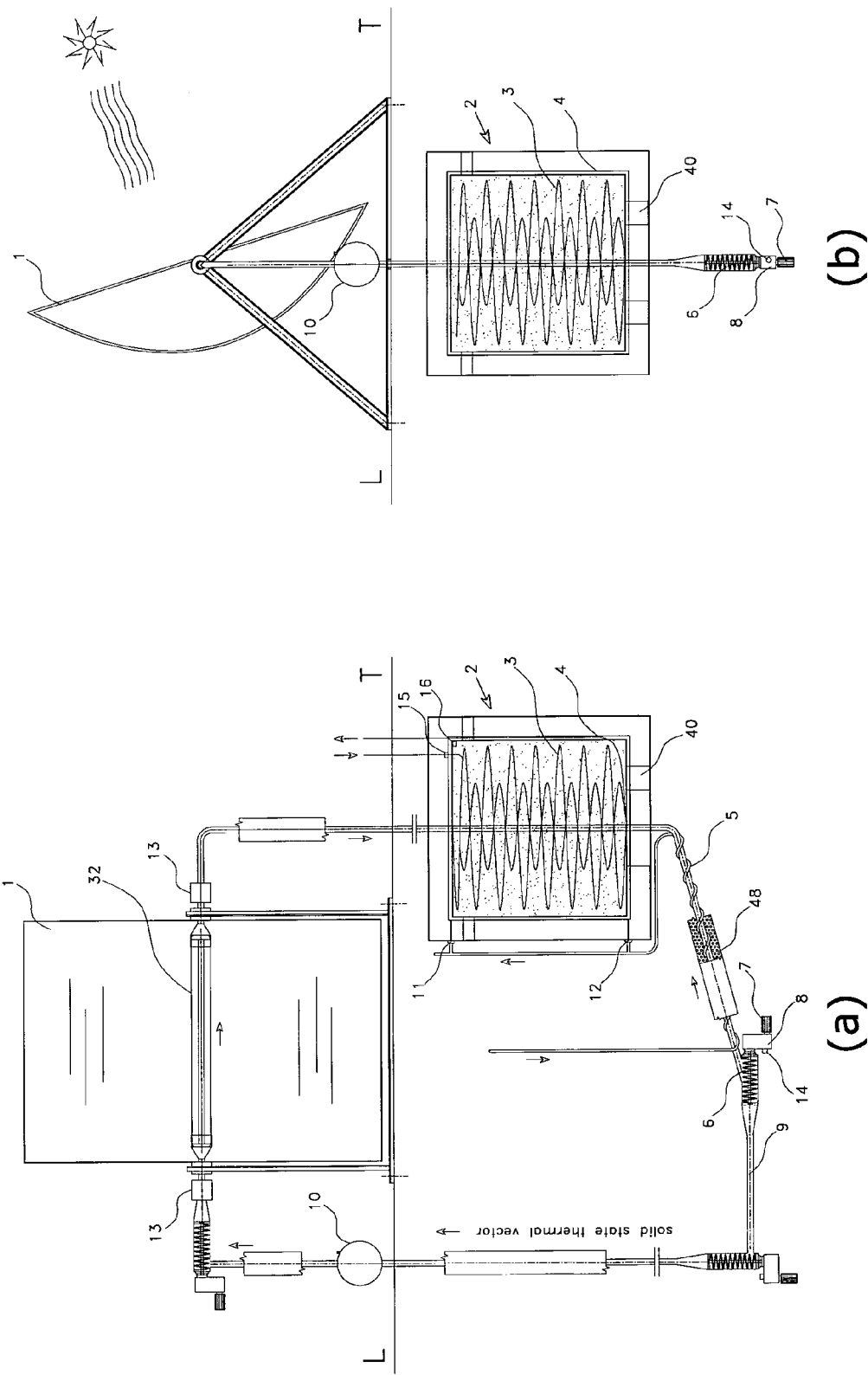
FIGS. 1(a) and 1(b) are a schematic front and side views respectively of an industrial parabolic trough solar concentration plant, according to a particular aspect of the present invention.
Figure 3:
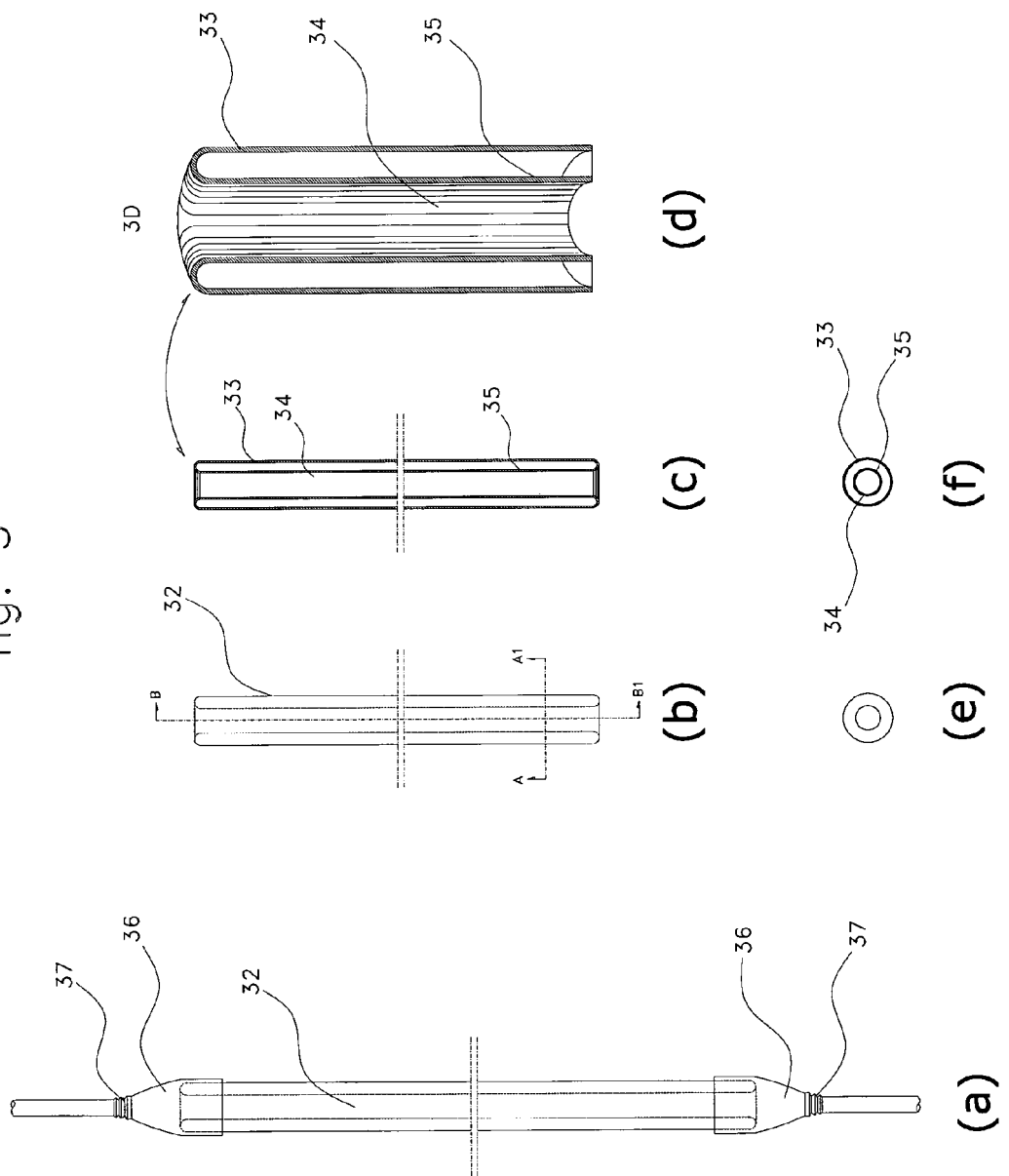

Referring to FIG. 1(a)-(b), an industrial parabolic trough solar concentration plant, whose purpose will be the production of electricity, is shown. Said industrial plant, according to a preferred aspect of the invention, comprises a series of horizontal parabolic troughs (1), in particular with a toroidal shaped receiver pipe (32), a heat accumulator (2), with an over heater inside (3), an internal pre-heater (4), and an external pre-heater (5), as well as a connecting pipe circuit, said horizontal parabolic troughs (1) with the relevant toroidal shaped receiver pipe (32) being part of a linear parabolic solar collectors. According to the invention, a solid state material is used as a thermal vector inside the illustrated solar concentration plant.

It should be noticed that, even if parabolic trough solar concentration plants only are mentioned in the present description, the claimed invention, i.e. said SSTV, can be easily implemented in any other solar concentration plant known in the art.

The SSTV (Solid State Thermal Vector) is pushed in the connecting pipe circuit by a set of screw conveyors (6), operated by an electrical engine (7), through a reduction gear (8).

According to a preferred embodiment of the present invention, the SSTV comprises a solid state material in grain and/or particle form (e.g. clinker material in particles ranging from 100 μm to 0.5 cm), possibly filled with helium or another noble gases. Anyway, as the skilled person can understand, the solid state material without any gaseous phase can be used instead.

According to a preferred embodiment of the present invention, as already cited, the SSTV comprises at least a mixture of clinker material in grain or particle form, possibly filled with helium. Said mixture of clinker material can be also possibly mixed with one or more of the following material (in grain or particle form as well): expanded clay clinker processed and/or high temperature furnaces ash and/or graphite.

The helium atmosphere pressure in the pipe (9) is controlled by an expansion vase (10). The interior/exterior pre-heater circuit is controlled by electrovalves (11) (12). Temperature and pressure within the connecting pipe circuit with SSTV are monitored by a series of sensors (13), while amperometers (14) monitor the screw conveyors state. Temperature and pressure within pre-heaters and over heater are also monitored by sensors (15), as is the heat accumulator (16).

Referring now to FIG. 2(a)-(b), the illustrated domestic parabolic trough solar concentration plant, whose purpose will be building heating, according to another embodiment of the present invention, includes a two axis parabolic trough (17), in particular provided with a toroidal shaped receiver pipe (thus constituting at least part of a solar collector), a heat accumulator (2), a heat diffuser (47), an internal pre-heater (4) and an external pre-heater (5), as well as a connecting pipe circuit into which—according to the present invention—a SSVT is used.

The SSTV, comprising a solid state material in grain form preferably filled with a gaseous phase like helium, is pushed by a set of screw conveyors (6), operated by an electrical engine (7), through a reduction gear (8). The helium atmosphere pressure in the pipe (9) is controlled by an expansion vase (10). The internal/external pre-heater circuit is controlled by electrovalves (11) (12). Temperature and pressure within the SSTV pipe circuit are monitored by a series of sensors (13), while amperometers (14) monitor the screw conveyors state. Temperature and pressure within pre-heaters are also monitored by sensors (15), as is the heat accumulator (16).

With reference to FIG. 3(a)-(f), it is illustrated a thermally resistant, low elongation glass or fused quartz pipe (32) of toroidal shape acting as a receiver pipe within a solar collector, according to another aspect of the present invention. This pipe (32) is mounted on the parabolic troughs (See FIG. 1(a)-(b) and FIG. 2(a)-(b). It is composed by two cylinders (33) (34). The outer face of the internal cylinder (35) is blackened through a superblack process; the two cylinders (33) (34) are solded together and vacuum is made inside. The receiver pipe (32) is connected to the other pipes trough two thermally insulated connectors (36), each of them with bellows (37) to accommodate possible deformations.

Considering now FIG. 4(a)-(b), it is shown a heat accumulator (2) for an industrial parabolic trough solar concentration plant, preferably dedicated to the production of electric power (see FIG. 1(a)-(b)). Such a heat accumulator (2) is composed by an outer metallic shell (38) and an inner core made of purified graphite (42), kept in place by metallic strips (39), that is in contact with the outer shell through a base and spacers of thermally insulated material (40). The empty space (41) between the core and the outer shell is filled with depressurized argon or other noble gases.

The SSTV pipe (43) crosses the heat accumulator (2). A steam over-heater (3), shaped as an adequately long metallic serpentine, is inserted within the heat accumulator core. An internal pre-heater (4) is inserted within the empty space (41), shaped as an adequately long metallic serpentine, while an external pre-heater (5), also shaped as an adequately long metallic serpentine, is in contact with the SSTV pipe (43). Both are wrapped with a thermally insulated material (48). The internal (4) and external (5) pre-heaters are connected to the overheater (3) with electrovalves (11) (12). Also the selection of the internal or external pre-heaters is done by means of electrovalves (11) (12). Pressure and temperature in internal pre-heater are monitored by sensors (15). Also temperature and pressure within the heat accumulator are monitored by sensors (16).

Relating to FIG. 5(a)-(b), it is illustrated a heat accumulator (2) for a domestic parabolic trough solar concentration plant dedicated to the production of hot water (see FIG. 2(a)-(b)), that is composed by an outer metallic shell (38) and an inner core made of clinker (49), kept in place by metallic strips (39), that is in contact with the outer shell through a base and spacers of thermally insulated material (40). The empty space (41) between the core and the outer shell is filled with depressurized argon or other noble gases. To ease heat distribution within the core, plates (47) of a metallic high heat conductor material, such as copper, are inserted. The SSTV circuit (43) crosses the heat accumulator. An internal pre-heater (4) is inserted within the empty space (41), shaped as an adequately long metallic serpentine, while an external pre-heater (5), also shaped as an adequately long metallic serpentine, is in contact with the SSTV circuit (43). Both are wrapped with a thermally insulated material (48). The outcoming internal (4) and external (5) pre-heaters are connected between them by bypasses controlled by electrovalves (11) (12). Also the selection of the internal or external pre-heaters is done by means of the electrovalves (11) (12). Pressure and temperature in pre-heaters and over-heater are monitored by a series of sensors (15). Also temperature and pressure within the heat accumulator are monitored by a series of sensors (16).

It should be noticed that it is extremely advantageous the use of a thermal vector at the solid state, in the form of a mixture of very-small to small sized grains and/or particles that has the properties of yielding good thermal effusivity and volumetric heat capacity, and whose composition (e.g. clinker material and/or expanded clay clinker processed and/or high temperature furnaces ash and/or graphite) is such that it can be pushed easily through the connecting pipe circuit by a set of screw conveyors, that it does not undergoes to chemical reactions up to at least 900° C., as well as it maintains unchanged the mechanical and physical properties both at the normal temperature of exercise and when the plant is inoperative, that does not yield problems when the plant is halted and then restarted, that does not pose problems of corrosion but actually acts as a natural lubricant.

The present invention, with the features described above, shows several advantages:
a) the use of a SSTV gives more efficiency to solar concentration plants, in particular in solar concentration plants provided with parabolic trough(s), since they can work with temperatures up to 800° C., the heating circuit can be halted in absence of solar radiance, and in the meantime it is safer, since its solid state, and can therefore be used also to heat buildings;
b) the receiver pipe, with a toroidal shape as previously described, implemented in the solar collector (for example in the above-described parabolic trough), according to a particular aspect of this invention, proves to be more resistant to thermal shocks than those currently on the market, maintaining however an almost equivalent efficiency in terms of thermal insulation as that of the receiver pipes currently available;
c) the heat stored in a solid state geothermal accumulator, buried in the ground, according to the above description and enclosed drawings, allows for extremely small heat dispersion. Depending on the material used in the accumulator core of said heat accumulator, it is possible either to store the heat for very prolonged periods of time, in the order of months, to produce hot water, or to efficiently modulate steam production to be used to generate electric power.
d) the external pre-heater allows to cool the SSTV, recovering most of the heat and further reducing heat dispersion.

The invention claimed is:

1. A parabolic through solar concentration plant comprising one or more solar collectors each including a parabolic trough, a heat exchanger, a heat accumulator and a connecting pipe circuit, wherein said connecting pipe circuit including therein a solid state thermal vector in grain or particle form for operating at a temperature of at least 500° C. within said connecting pipe circuit, said grains or particles comprise at least clinker material, said clinker material comprising calcium silicates and calcium aluminates, the clinker material having a particle size ranging from 100 μm to 0.5 cm, and wherein said connecting pipe circuit is adapted with mechanical means to push said solid state thermal vector through said connecting pipe circuit.

2. The solar concentration plant according to claim 1, wherein said connecting pipe circuit further includes a gas.

3. The solar concentration plant according to claim 1, wherein said mechanical means are screw conveyors.

4. The solar concentration plant according to claim 1, wherein said collectors comprise a toroidal shaped receiver pipe.

5. The solar concentration plant according to claim 1, wherein said heat accumulator is buried in the ground.

6. The solar concentration plant according to claim 1, wherein said heat accumulator comprises an external outer shell, a thermal insulator and an internal core in which the connecting pipe circuit is going through.

7. The solar concentration plant according to claim 6, wherein said external outer shell is metallic and said internal core comprises clinker, graphite, copper, or a combination thereof.

8. The solar concentration plant according to claim 1, wherein said collector comprises a lens.

9. The solar concentration plant according to claim 1, wherein said grains or particles of said solid state thermal vector do not undergo chemical reactions up to at least 900° C. within the connecting pipe circuit.

10. The solar concentration plant according to claim 1, wherein said solid state material in grain or particle form further comprises expanded processed clay clinker, high temperature furnaces ash, graphite, or a combination thereof.

11. The solar concentration plant according to claim 1, wherein said plant comprises an external pre-heater shaped as a metallic serpentine.

12. The solar concentration plant according to claim 2, wherein said gas is a noble gas.

* * * * *